(12) United States Patent
Li et al.

(10) Patent No.: US 8,117,050 B2
(45) Date of Patent: Feb. 14, 2012

(54) ADVERTISER MONETIZATION MODELING

(75) Inventors: Hua Li, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 12/131,124

(22) Filed: Jun. 2, 2008

(65) Prior Publication Data

US 2009/0299831 A1    Dec. 3, 2009

(51) Int. Cl.
*G06Q 40/00* (2006.01)
*G06Q 30/00* (2006.01)
*G01C 21/34* (2006.01)

(52) U.S. Cl. .............................. 705/4; 705/14.73; 705/6

(58) Field of Classification Search .... 705/14.41–14.49, 705/14.5–14.59, 14.6–14.69, 14.7–14.73, 705/6, 53–54
See application file for complete search history.

(56) References Cited

U.S. PATENT DOCUMENTS

| | | | |
|---|---|---|---|
| 7,295,996 B2 | 11/2007 | Skinner | |
| 2004/0044571 A1 | 3/2004 | Bronnimann et al. | |
| 2004/0167845 A1* | 8/2004 | Corn et al. | 705/37 |
| 2005/0137939 A1 | 6/2005 | Calabria et al. | |
| 2005/0159974 A1* | 7/2005 | Moss et al. | 705/1 |
| 2006/0026061 A1* | 2/2006 | Collins | 705/14 |
| 2006/0095281 A1 | 5/2006 | Chickering et al. | |
| 2006/0248035 A1 | 11/2006 | Gendler et al. | |
| 2007/0016473 A1 | 1/2007 | Anderson et al. | |
| 2007/0124287 A1 | 5/2007 | Gorodyansky | |
| 2007/0233653 A1 | 10/2007 | Biggs et al. | |
| 2007/0255690 A1 | 11/2007 | Chang et al. | |
| 2008/0004990 A1 | 1/2008 | Flake et al. | |
| 2008/0103893 A1* | 5/2008 | Nagarajan et al. | 705/14 |
| 2008/0255937 A1* | 10/2008 | Chang et al. | 705/14 |
| 2008/0275757 A1* | 11/2008 | Sharma et al. | 705/10 |
| 2009/0171721 A1* | 7/2009 | LeBaron et al. | 705/7 |

OTHER PUBLICATIONS

Elesseily, Mona. "New Panama Ranking System for Yahoo Ads Launches Today." Search Engine Land Website. Feb. 5, 2007. <http://searchengineland.com/new-panama-ranking-system-for-yahoo-ads-launches-today-10434>. Retrieved Nov. 19, 2010 (3 pages).*

"Early Watch: Yahoo! Announces the Launch of its New Search Marketing Ranking Model in the U.S. on Feb. 5". M2 Presswire. Coventry: Jan. 24, 2007, p. 1 (3 pages).*

Ozluk, Ozgur and Susan Cholette. "Allocating Expenditures Across Keywords in Search Advertising." Journal of Revenue and Pricing Management. vol. 6, 4 347-356, Jul. 11, 2007 (11 pages).*

Richardson, et al., "Predicting Clicks: Estimating the Click-Through Rate for New Ads", Proceedings of the 16th international conference on World Wide Web, Banff, Alberta, Canada, Session: Advertisements & click estimates, May 8-12, 2007, pp. 521-529.

(Continued)

*Primary Examiner* — Elda Milef

(57) ABSTRACT

Embodiments of the claimed subject matter provide a method and system for modeling advertiser monetization. The claimed subject matter provides a method and system from which an advertisement may be evaluated according to various metrics to determine a quality relative to other advertisements. The relative quality considers the content of the advertisement, the performance of the advertisement and the history of the advertiser's bidding behavior.

One embodiment of the claimed subject matter is implemented as a method for advertiser monetization modeling. One or more advertisements are received from one or more advertisers. The quality of the advertisement(s) is defined according to certain metrics, such as the quality of the content of the advertisement, the quality of the past and estimated future performance of the advertisement and the history of bidding behavior of the advertiser. After the respective quality of the advertisement(s) is determined, the advertisement(s) is ranked with other advertisements according to the determined quality.

19 Claims, 6 Drawing Sheets

OTHER PUBLICATIONS

Agichtein, et al., "Improving Web Search Ranking by Incorporating User Behavior Information", Proceedings of the 29th annual international ACM SIGIR conference on Research and development in information retrieval, Seattle, Washington, USA, Session: User behavior and modeling, Aug. 6-11, 2006, pp. 19-26.

Regelson, et al., Predicting Click-Through Rate Using Keyword Clusters, In Second Workshop on Sponsored Search Auctions, Jun. 11, 2006, 6 Pages.

* cited by examiner

ADVERTISER MONETIZATION MODELING

BACKGROUND

The unprecedented speed, versatility, and capacity available through which information can be communicated and disseminated over the Internet have revolutionized the business and practice of numerous industries. These features, in conjunction with the popularization of Internet usage have enabled the rise of entirely new fields of commerce. Not surprisingly, the number of commercial transactions conducted over the Internet has increased commensurately as a response to increases in both Internet users and consumer confidence in security measures available to transactions over the Internet. As a result, advertisement over the Internet has emerged as an important and lucrative market.

Advertisement over the Internet typically includes a textual or graphical URL link representative of the good or service the advertiser is advertising and/or proffering to sell. The link navigates to a "landing page," generally a webpage belonging to the advertiser, but which may also be a directory of aggregated links to other landing pages of equivalent or similar goods or services. The advent of search engines and popular content-specific websites has further expanded the Internet advertising industry. For example, search engines that generate a search result list from a user-inputted search term have been adapted to incorporate corresponding or relevant advertisements in the returned search result list.

The emergence of advertisement over the Internet, along with the features inherent to the Internet has also expanded traditional methods of calculating advertising fees. Advertisement publishers for traditional advertisement mediums, such as those produced on physical structures (e.g., billboards) or published over media broadcasts (e.g., television and radio), typically charge rates based on physical attributes (e.g., the size or position of a billboard or newspaper advertisement) or for the duration of a discrete increment of time (for radio and television broadcasts). However, the effectiveness of an advertisement (i.e., the consumption or heightened consumer interest directly or indirectly attributable to the advertisement) over traditional advertisement mediums is extremely difficult to calculate with any amount of precision.

In contrast, publishers of advertisement over the Internet, due to the ability to monitor user activity and website traffic, are able to accurately and automatically account for both increased consumption as well as presumably heightened consumer interest. For example, for any advertisement displayed on a website or in a list of search results from a search engine, a publisher of an advertisement (typically the owner of the website or search engine) is able to control and track the number of times an advertisement is displayed, as well as the number of Internet users that navigate to the landing page of the advertisement by clicking through the advertisement (the act of navigating by physically clicking on a URL link, is known as a "clickthrough").

The rate of navigating users, known as "clickthrough rates" therefore represents the number of Internet users that navigate to the landing page of the advertisement for each display of the advertisement. A "conversion" is a term used for the number of clickthrough users that actually purchase the proffered good or service from the advertiser. Accordingly, the calculation of advertising fees for advertisements over the Internet has developed to include additional metrics to evaluate and account for an advertisement's effectiveness, often by charging additional fees per clickthrough and/or conversion. A typical fee structure—known as a "bidding point"—for an advertiser may include a fee for each "impression" (i.e., a single display of the advertisement to a user) and additional fees for each clickthrough or conversion. Often, fee structures will be structured to strictly adhere to the perceived relevance of an advertisement. However, this approach may achieve suboptimal results.

The relevance of an advertisement to a search term is naturally correlative to clickthrough and conversion rates, and thus, the relevance of an advertisement typically corresponds to the generation of revenue for the publisher of the advertisement. However, strict or heavy reliance on the relevance of an advertisement may not result in the most effective method for advertisement publishers to optimize revenue gain. For example, some new, small, or otherwise unknown advertisers might produce advertisements which are extremely relevant to a search query, however, due to their lack of brand (or product) awareness, Internet users may lack confidence in the products and services of these advertisers as consumers, and prefer more well-known advertisers or products with less relevant advertisements. In cases such as these, both the relevance as well as the history of the advertisements should be considered.

Another example when strict reliance on the relevance of an advertisement is suboptimal occurs as result of advertiser bidding behavior. Advertisers with relevant advertisements but who have exceedingly low bidding points may generate less revenue for search engines and advertisement publishers than advertisers with irrelevant advertisements and high bidding points. Accordingly, current fee structures, due to factors such as inflexibility and/or over-reliance on single metrics may achieve sub optimal results for Internet advertising publishers.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The claimed subject matter is directed to advertiser monetization modeling. Specifically, the claimed subject matter provides a method and system from which an advertisement may be evaluated according to various metrics to determine the quality of the advertisement relative to other advertisements. The relative quality considers the content of the advertisement, the performance of the advertisement and the history of the advertiser's bidding behavior.

Information obtained from the determination of the relative quality of an advertisement may be used to build advertisement data models, which in turn may be utilized to achieve certain desired business goals, such as increasing advertisement coverage, increasing the flow of effective traffic to a website, and increasing advertisement-driven revenue for advertisement publishers, etc. . . .

One embodiment of the claimed subject matter is implemented as a method for advertiser monetization modeling. One or more advertisements are received from one or more advertisers. The quality of the advertisement(s) is defined according to certain metrics, such as the quality of the content of the advertisement, the quality of the past and estimated future performance of the advertisement and the history of bidding behavior of the advertiser. After the respective quality of the advertisement(s) is determined, the advertisement(s) is ranked with other advertisements according to the determined quality.

Another embodiment of the claimed subject matter is implemented as a system for advertiser monetization modeling. The system is implemented as a receptacle for receiving advertisements from advertisers and displaying the advertisements to consumers and/or audiences. The receptacle may further comprise a data resource which stores the advertisement and data regarding the advertisement, and an advertising engine which processes the advertisement, determines the quality of the advertisement a user's information and ranks the advertisement according to the determined quality of the advertisement.

DETAILED DESCRIPTION

Figure 1:
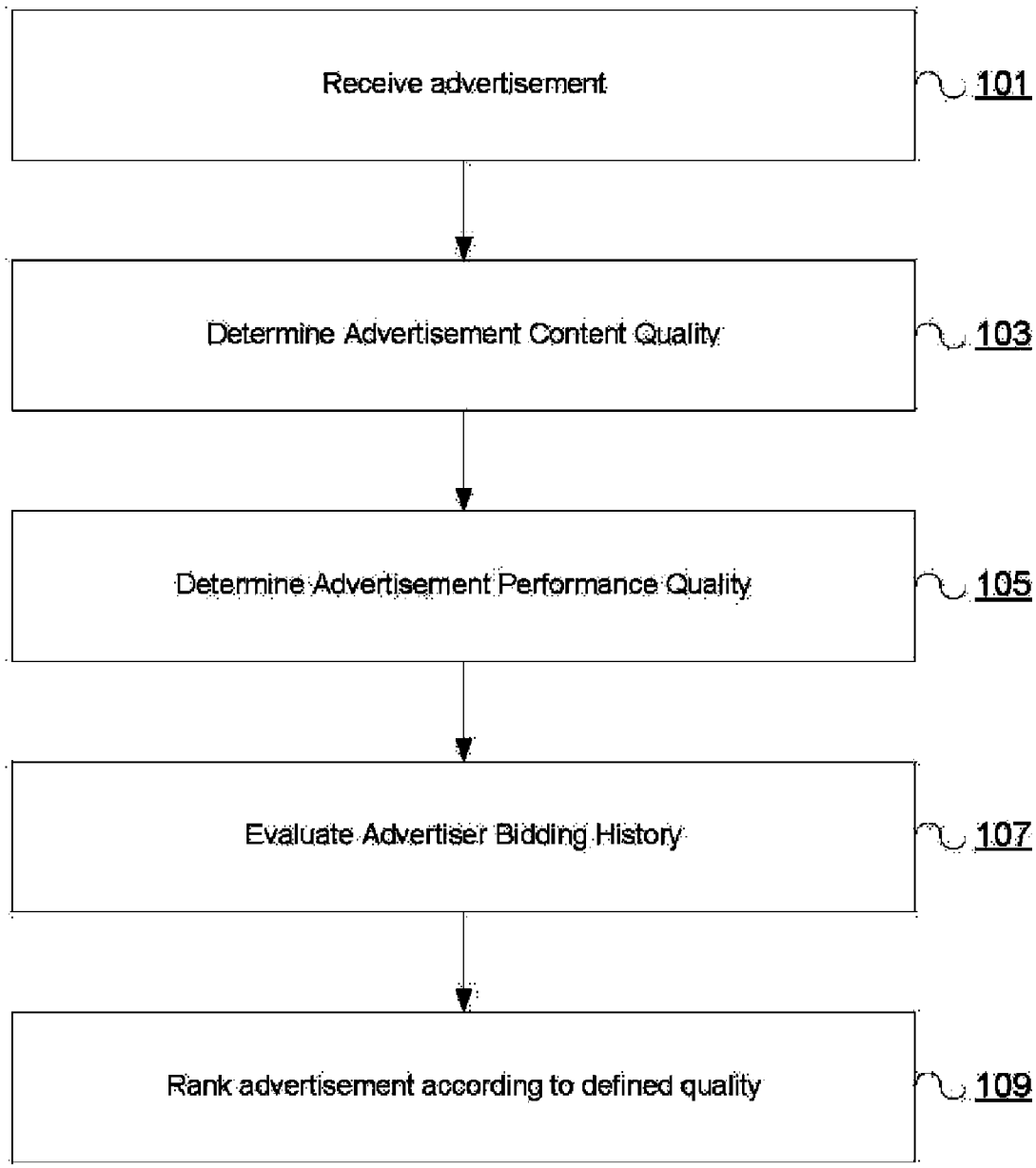
FIG. 1 depicts a flowchart describing a process for modeling advertiser monetization in accordance with various embodiments of the claimed subject matter.

Reference will now be made in detail to embodiments of the claimed subject matter, a method and system for advertiser monetization, examples of which are illustrated in the accompanying drawings. While the claimed subject matter will be described in conjunction with the embodiments, it will be understood that they are not intended to be limited to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the claimed subject matter provide a method and system for advertiser monetization modeling. The claimed subject matter provides a method and system for modeling advertiser monetization, from which an advertisement may be evaluated according to described metrics to determine a relative quality. The relative quality considers the content of the advertisement, the performance of the advertisement and the history of the advertiser's bidding behavior. Embodiments of the claimed subject matter and its benefits are further described below.

FIG. 1 depicts a flowchart describing a process 100 for modeling advertiser monetization. Steps 101-109 describe exemplary steps comprising the process 100 in accordance with the various embodiments herein described.

According to the process 100 of FIG. 1, one or more advertisements are received from one or more advertisers by an advertisement publishing center at step 101. The advertisement publishing center is a component for the reception and manipulation of advertisements and information related to the advertisements and may include a data storage facility and an output terminal.

According to embodiments of the present claimed subject matter, an advertisement will comprise a textual or graphical URL link to one or more landing pages. These landing pages will typically be under the control or administration of the advertiser (e.g., a webpage from the advertiser's website), and may also provide additional information and/or specific transactional functionality (e.g., ordering, purchasing or sales) regarding the proffered good or service.

In one embodiment, the advertisement publishing center may also include an Internet search engine. According to this embodiment, the advertisement is displayed in a list of search results generated by the search engine of the advertisement publishing center in response to a search query for a search term. For example, an advertisement for the sale of a specific model of shoes may be displayed when a user of the search engine of the advertisement publishing center submits a search query for a search term "shoes," or if the user of the search engine submits a search query for the specific (or related) brand or model of the advertised product. In one embodiment, the correlation between the advertisement and any corresponding search terms is performed automatically by the advertisement publishing center.

In a further embodiment, the advertiser submits one or more search terms to the advertisement publishing center that the advertiser would like the advertisement publishing center to correlate the advertisement to. The advertisement publishing center could thus display the advertisement to a user of the advertisement publishing center's search engine when the user searches for any of the corresponding search terms.

At step 103, the quality of the content of the advertisement is determined. The content of the advertisement may include the textual and/or graphical component of the advertisement, as displayed to a potential consumer. The content of the advertisement may also include the visual (i.e., text/graphic) elements and the subject matter of the landing pages of the advertisement. The content of the advertisement may be determined individually, relative to similar or related advertisements, or relative to all advertisements received by the advertising publishing center.

At step 105, the quality of the performance of the advertisement is determined. Performance of an advertisement is determined according to the effectiveness of the advertisement in attracting user activity from users the advertisement is displayed to. For example, the history of user clickthroughs and conversions for an advertisement may be included in the determination of the performance of the advertisement.

In one embodiment, the determination of the quality of the performance of the advertisement may depend upon whether an advertisement has an established history of performance, or if the performance of the advertisement is relatively unknown (i.e., the advertisement is new, the proffered good or service is new or not well known, or the advertisement is for an obscure product/service).

In another embodiment, the aggregated history of user clickthroughs and conversions for all advertisements from an advertiser may also be considered.

At step 107, the history of the bidding behavior of the advertiser is evaluated. The history of the bidding behavior is evaluated according to the behavior previously displayed by the advertiser. For example, an evaluation of the bidding behavior of the advertiser may consider the historical cost per click rate (the price an advertiser is charged for each clickthrough) of an advertisement with an established history of performance. An evaluation of the bidding behavior of the advertiser may also consider the historical monthly budget of the advertisement. Another example includes accounting for any bidding, budget, or advertising campaigns initiated by the advertiser. According to one embodiment, a flexible and/or active advertiser may be awarded a higher evaluation. According to a further embodiment, progressive advertisers may also be evaluated preferentially.

At step 109, the advertisement is ranked among other similar advertisements according to the determined quality of the advertisement, as provided above. In one embodiment, an advertisement corresponds to one or more search terms that comprise a search query submitted to a search engine. When a user of the search engine submits a search query for any of the search terms corresponding to the advertisement, the search engine returns a search result list of URL links corresponding webpages. According to some embodiments, the search result list may also include a distinct sub-list of corresponding advertisements relevant to the search term. In other embodiments, the corresponding advertisements are incorporated within the search result list and are not distinguished from non-advertisements.

In a further embodiment, the search result list may display the advertisements in order of their determined quality rank. Thus, advertisements with greater determined quality will be displayed prior (or above) advertisements with lower determined quality. In a still further embodiment, the position of the advertisement in the search result list is recorded, and subsequent determinations of the quality of the advertisement may include considering the average position of the advertisement in the list of search results generated by a search engine from a search query for a corresponding search term.

Figure 2:
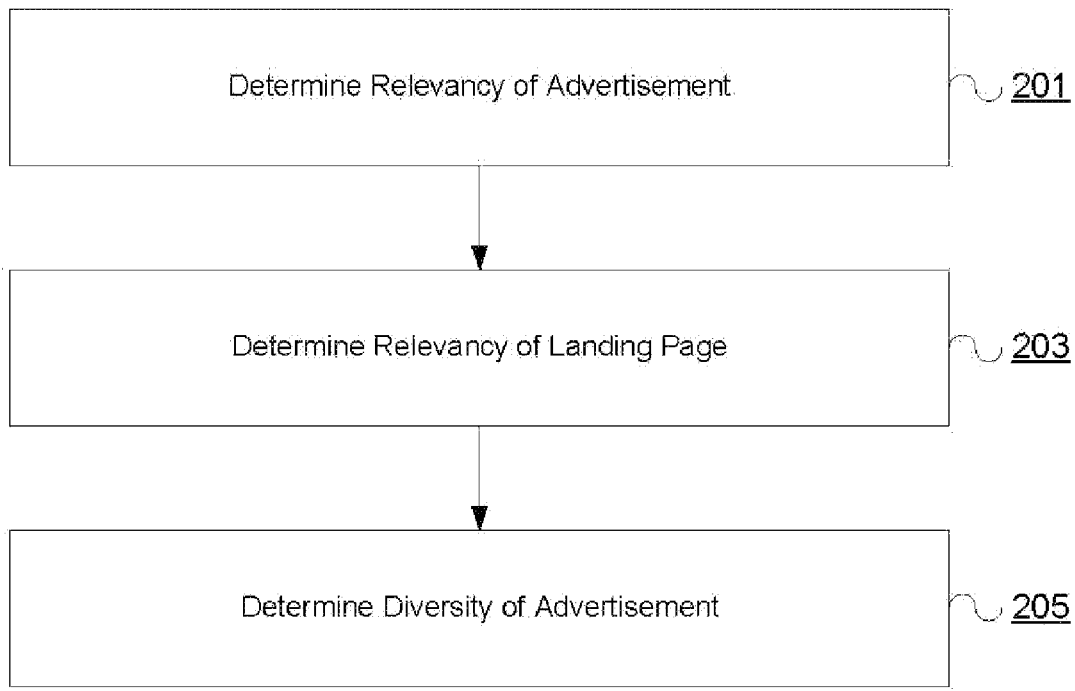
FIG. 2 depicts a flowchart describing a process for determining the quality of the content of an advertisement in accordance with various embodiments of the claimed subject matter.

FIG. 2 depicts a flowchart describing a process 200 for determining the quality of the content of an advertisement. Steps 201-205 describe exemplary steps comprising the process 200 in accordance with the various embodiments herein described.

In one embodiment, the advertisement corresponds to one or more search terms that comprise a search query submitted to a search engine. At step 201, the quality of the content of the advertisement may be defined by determining the relevancy of the advertisement to the search query and/or to any search terms corresponding to the advertisement. Relevancy of the advertisement to the search query or to any search terms corresponding to the advertisement may be derived according to any criteria determined by the advertising publishing center. For example, the advertising publishing center may determine the relevancy of the advertisement by evaluating the relevancy of the textual or graphical component of the advertisement as displayed to a user. Well-known advertisers with established presences in the specific market of an advertisement may also be evaluated with preference.

At step 203, the quality of the content of the advertisement is further defined by the advertising publishing center by determining the relevancy of the landing page of the advertisement. The relevancy of the landing page is determined similarly to the relevancy of the advertisement, and may also include the subject matter of the landing page, along with any text or graphical components displayed in the landing page.

At step 205, the quality of the content of the advertisement is further defined by the advertising publishing center by determining the diversity of the advertisement. In some instances, an advertisement is not specific to one advertiser, but acts as an aggregator of two or more "smaller" advertisements. The landing page of the advertisement may thus be its own list of advertisements. The diversity of a given advertisement is thus a measure of the "uniqueness" of an advertisement—i.e., whether the advertisement is unique to an advertiser and/or a product. A higher evaluation will be given to unique advertisements.

Figure 3:
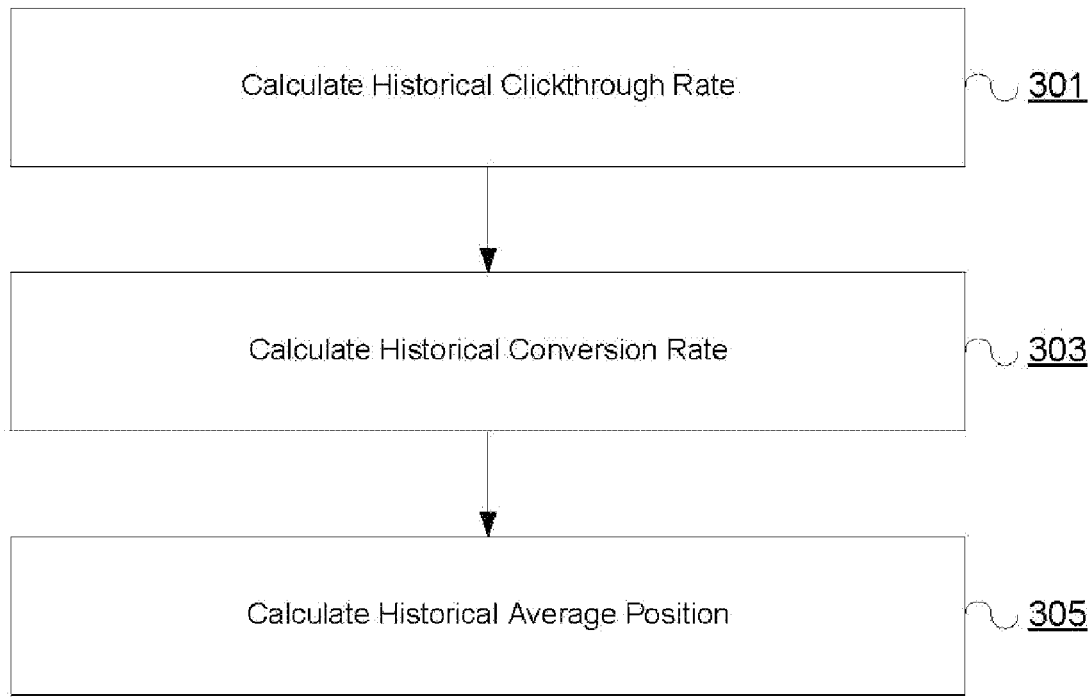
FIG. 3 depicts a flowchart describing a process for determining the quality of the performance of an advertisement with an established history of performance in accordance with various embodiments of the claimed subject matter.

FIG. 3 depicts a flowchart describing a process 300 for determining the quality of the performance of an advertisement with an established history of performance. Steps 301-305 describe exemplary steps comprising the process 300 in accordance with the various embodiments herein described.

At step 301, the historical clickthrough rate of the advertisement is calculated. The clickthrough rate is defined as the ratio of user clickthroughs for an advertisement to the number of times the advertising publishing center displays the advertisement ("impression"). For example, if for every ten instances the advertisement is displayed by the advertising publishing center, two users will clickthrough to the landing page of the advertisement, the clickthrough rate would be represented as 2:10 (or 1:5). Thus, at step 301, the clickthrough rate for the advertisement over a period of time is determined by the advertising publishing center (e.g., over the past year, over the lifetime of the advertisement, etc.) for the purposes of evaluating the quality of the performance of the advertisement.

At step 303, the historical conversion rate of the advertisement is calculated. The conversion rate is calculated as the rate of completed transactions for the advertised good or service from a user clickthrough per impression. Accordingly, the conversion rate for the advertisement over a period of time is determined by the advertising publishing center for the purposes of evaluating the quality of the performance of the advertisement.

Figure 4:
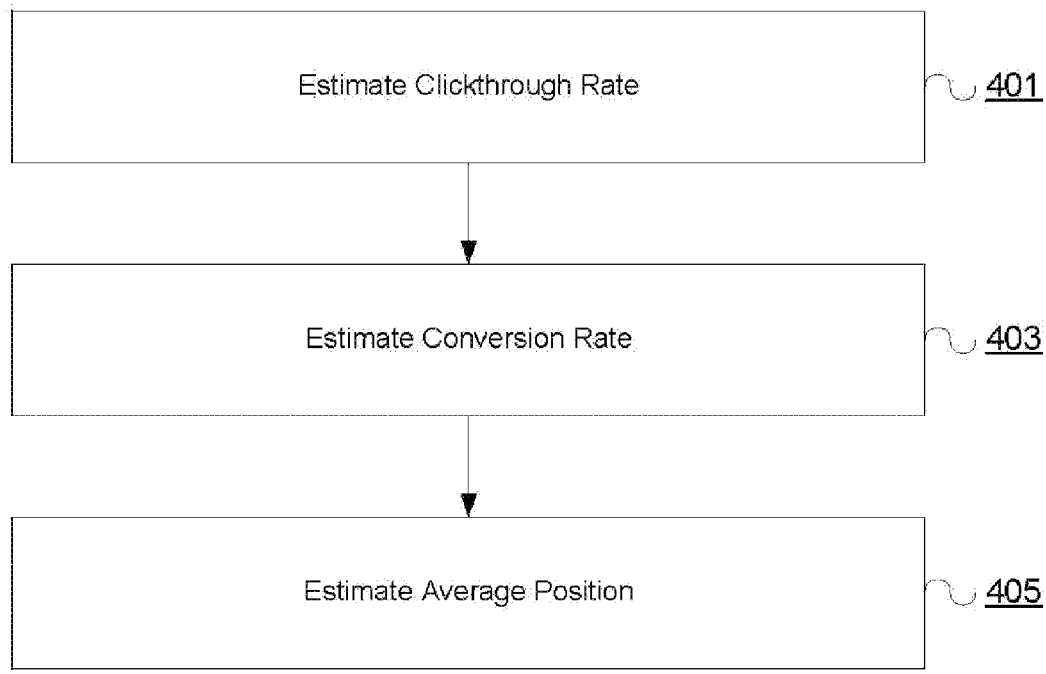
FIG. 4 depicts a flowchart describing a process for estimating the quality of the performance of an advertisement without an established history of performance in accordance with various embodiments of the claimed subject matter.

In some embodiments, the advertisement is ranked and displayed in a search result list generated by a search engine in response to a search query for one or more search terms, and the position of the advertisement in the search result list is recorded. According to these embodiments, at step 305, the historical average position of the advertisement in the list of search results generated by a search engine from a search query for a corresponding search term is calculated and considered in a determination of the quality of the performance of an advertisement with an established history of performance.

Where an advertisement is new or relatively unknown and does not have an established history of performance, the quality of the performance of the advertisement is estimated. FIG. 4 depicts a flowchart describing a process 400 for estimating the quality of the performance of an advertisement without an established history of performance. Steps 401-405 describe exemplary steps comprising the process 400 in accordance with the various embodiments herein described.

At step 401, the clickthrough rate of the advertisement is estimated for the purposes of evaluating the quality of the performance of the advertisement without an established history of performance. The clickthrough rate of the advertisement may be estimated by the advertising publishing center by considering related advertisements (i.e., previous advertisements from the same advertiser), and/or similar advertisements for similar products/services from different advertisers.

At step 403, the conversion rate of the advertisement is estimated for the purposes of evaluating the quality of the performance of the advertisement without an established history of performance. As with estimating clickthrough rates in step 401, the conversion rate of the advertisement may also be estimated by the advertising publishing center by considering related advertisements (i.e., previous advertisements from the same advertiser), and/or similar advertisements for similar products/services from different advertisers.

Likewise, for advertisements that lack established histories of performance, the average position of the advertisement in the list of search results generated by a search engine from a search query for a corresponding search term is determined by the advertising publishing center at step 405 by considering related advertisements (i.e., previous advertisements from the same advertiser), and/or similar advertisements for similar products/services from different advertisers.

Figure 5:
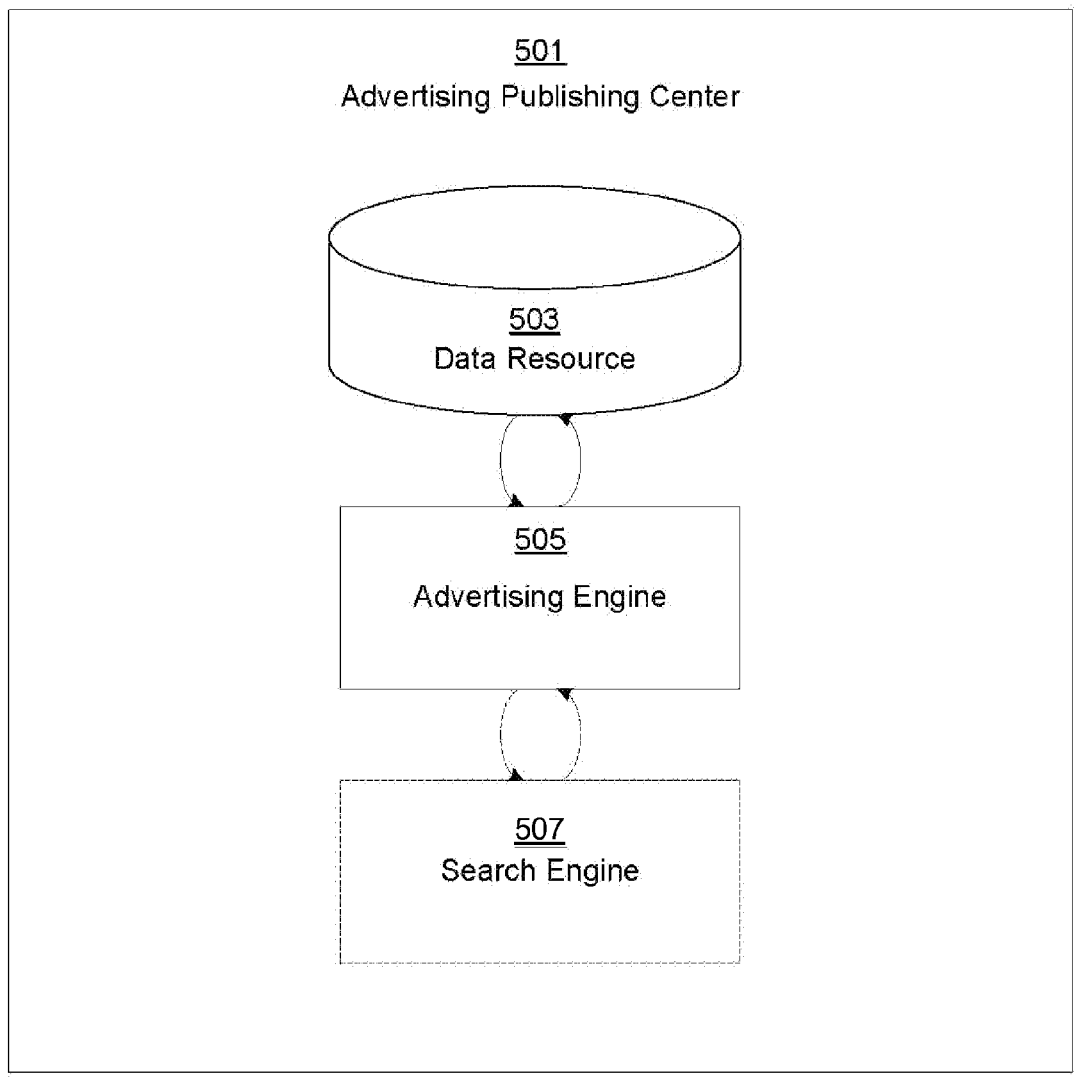
FIG. 5 is a diagram describing a system for monetizing one or more advertisements in accordance with various embodiments of the claimed subject matter.

FIG. 5 is a diagram describing a system 500 for monetizing one or more advertisements in accordance with various embodiments herein described.

According to the system 500 of FIG. 5, the system 500 comprises an advertising publishing center 501, which includes a data resource 503, and an advertising engine 505. According to some embodiments, the advertising publishing center 501 may also include a search engine 507. The advertising publishing center 501 may comprise any receptacle for physical and/or electronic data, or any medium through which an advertisement may be communicated. For example, the advertising publishing center 501 may be implemented as a single operating computing device, a system of networked databases, a physical storage receptacle, or any combination thereof (depending on the medium(s) of the advertisement).

The advertising publishing center 501 receives advertisements which the advertising publishing center 501 stores in the data resource 503. In one embodiment, an advertisement may include the actual computer file (e.g., an image file, document, etc. . . . ). The advertisement may also include specified search terms, which the advertiser would like the advertising publishing center to display to a user of the search engine 507 when the user searches for any of the specified search terms. According to some embodiments, the data resource 503 also stores the data recorded from the performance of the advertisements in the past. In still further embodiments, the data resource 503 also stores bidding behavior (e.g., accounting) for advertisers, which may be further classified according to specific advertising campaigns.

The advertising publishing center 501 displays the advertisements to one or more targeted audiences through services affiliated with the advertising publishing center 501. Affiliated services may include, for example, a search engine, or website. The targeted audiences may comprise users or audiences of the affiliated services. The determination of which advertisements the advertising publishing center 501 will display to the user is performed by the advertising engine 505, which processes the advertisement(s) and determines the quality of each advertisement according to the metrics established by the advertising publishing center 501. The derived quality of each advertisement may comprise a relative value or score. The advertising engine 505 also ranks the advertisements according to the determined quality (e.g., by value).

Accordingly, the advertising engine 505 will reference the advertisement-specific data (e.g., content, performance, advertiser bidding behavior) in the data resource 503 to determine the respective qualities that the advertising engine 505 will use to rank advertisements. The ranking determined by the advertising engine 505 is thus used by the advertising publishing center 501 to determine which advertisement to display to the user. For example, the advertising publishing center 501 may elect to display only the five highest ranked advertisements to the user. According to one embodiment, the quality of an advertisement is determined by evaluating the advertisement according to three aspects: the quality of the content of the advertisement, the quality of the performance of the advertisement and the history of the bidding behavior of the advertiser.

In embodiments that include a search engine 507, the search engine 507 receives one or more search terms that comprise a search query from a user. The search engine 507 generates and displays to the user a search result list comprising URL links to relevant webpages in response to the search query. According to some embodiments, the advertising publishing center 501 may use a portion of the display of the search result list to display one or more advertisements to the user of the search engine 507. The advertising publishing center 501 queries the advertising engine 505 to generate a set of candidate advertisements ranked by quality with respect to the search query. Since relevancy is a factor in determining the quality of an advertisement, each search query may have a unique set of ranked candidate advertisements to display. The advertising publishing center 501 then displays a subset of the candidate advertisements which include the advertisements with the highest determined qualities with respect to the search query. The size of the subset may be pre-determined (i.e., always displaying the five advertisements with the highest quality scores) or subject to the present existing constraints.

In a further embodiment, the advertisements are displayed in a specific advertisement-exclusive search result sub-list. In another embodiment, the advertising publishing center 501 may display the advertisements indistinguishably among the non-advertised search results in the search result list. The position of each advertisement in any generated set of candidate advertisements is recorded by the advertising publishing center 501 in the data resource 503. The position of an advertisement in all generated sets of candidate advertisements is averaged for that advertisement, and may be considered by the advertising engine 505 in subsequent determinations of the quality of the advertisement.

Figure 6:
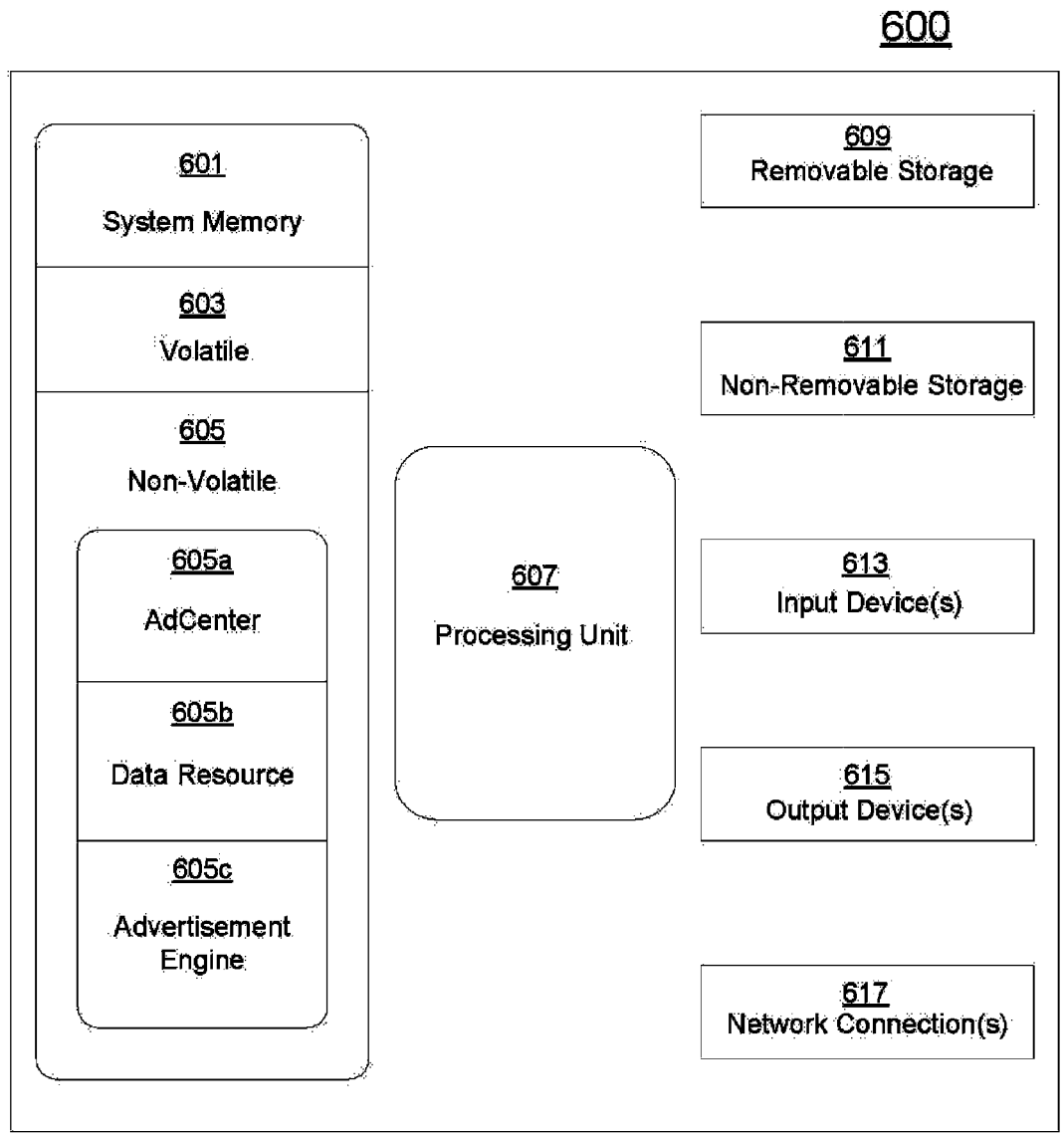
FIG. 6 depicts an exemplary computing device in accordance with various embodiments of the claimed subject matter.

FIG. 6 depicts an exemplary computing device 600 according to various embodiments. Computing device 600 depicts the components of a basic computer system providing the execution platform for certain software-based functionality in accordance with various embodiments. Computing device 600 can be an environment upon which the system 500 for monetizing one or more advertisements is instantiated. Computing device 600 can include, for example, a desktop computer system, laptop computer system or server computer system. Similarly, computing device 600 can be implemented as a handheld device (e.g., cell-phone, etc.) Computing device 600 typically includes at least some form of computer readable media. Computer readable media can be a number of different types of available media that can be accessed by computing device 600 and can include, but is not limited to, computer storage media.

In its most basic configuration, computing device 600 typically includes processing unit 607 and memory 601. Depending on the exact configuration and type of computing device 600 that is used, memory 601 can be volatile 603 (such as RAM), non-volatile 605 (such as ROM, flash memory, etc.) or some combination thereof. In one embodiment, the advertising publishing center 605a, data resource 605b and advertising engine 605c are instantiated in the non-volatile memory 605.

In some embodiments, the system 600 may be fully or partially implemented in the volatile memory 603 of a computing device 600. Additionally, computing device 600 can include mass storage systems (removable 609 and/or non-removable 611) such as magnetic or optical disks or tape. The computing device 600 can include input devices 613 and/or output devices 615 (e.g., such as a display). In addition, computing device 600 can include network connections 617 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of advertiser monetization modeling comprising:
   receiving one or more advertisements from one or more advertisers in an advertisement publishing center;
   evaluating quality of the advertisements received by the advertisement publishing center according to graphical and text content of the advertisement relative to other advertisements, relevancy of a landing page of the advertisement, and determining diversity of the advertisement based on uniqueness of the advertisement to an advertiser, using a processor;
   evaluating the quality of the advertisements received by the advertisement publishing center according to performance of the advertisement using the processor;
   evaluating the quality of the advertisements received by the advertisement publishing center according to history of bidding behavior of the advertiser of the advertisement using the processor; and
   ranking the advertisements among similar or related advertisements according to the evaluated quality of the advertisements in the advertisement publishing center using the processor.

2. The method of claim 1, wherein an advertisement comprises a URL link to one or more landing pages.

3. The method of claim 2, wherein the advertisement publishing center includes a search engine.

4. The method of claim 3, wherein the advertisement is displayed in a list of search results generated by the search engine in response to a search query for one or more search terms.

5. The method of claim 4, wherein the advertisement is displayed with other advertisements in the list of search results according to the ranking of the advertisements.

6. The method of claim 4, wherein determining the quality of the content of the advertisements further comprises:
   determining the relevancy of the advertisement to the search query for the search terms corresponding to the advertisement by determining the relevancy of the landing page of the advertisement including text and graphical components displayed in the landing page; and
   determining the diversity of the advertisement based on uniqueness of the advertisement to a product.

7. The method of claim 4, wherein determining the quality of the performance of the advertisement further comprises:
   determining the quality of a historical performance of the advertisement if the advertisement has an established history of performance; and
   estimating the quality of the performance of the advertisement if the advertisement lacks the established history of performance.

8. The method of claim 7, wherein determining the quality of the performance of the advertisement with the established history of performance further comprises:
   calculating a historical clickthrough rate of the advertisement;
   calculating a historical conversion rate of the advertisement; and
   calculating a historical average position of the advertisement in the list of search results generated by the search engine from the search query for the search term.

9. The method of claim 7, wherein estimating the quality of the performance of the advertisement lacking the established history of performance further comprises:
   estimating a clickthrough rate of the advertisement according to similar or related advertisements;
   estimating a conversion rate of the advertisement according to similar or related advertisements; and
   estimating an average position of the advertisement on the list of search results generated by the search engine from the search query for the search term.

10. The method of claim 1, wherein evaluating the history of bidding behavior of the advertiser of the advertisement further comprises:
    calculating a historical cost per click rate of the advertisement;
    calculating a historical monthly budget of the advertisement; and
    calculating historical changes or modifications to a bidding price of the advertisement.

11. A system for monetizing advertisements, the system comprising:

an advertising publishing center that receives the one or more advertisements using a processing unit;

a data resource that stores data corresponding to the advertisements in a memory; and an advertisement engine which defines the advertisements according to the data corresponding to the advertisements stored in the data resource, and ranks the advertisements according to a defined quality of the advertisements using the processing unit, wherein the defined quality of the advertisements is determined by content of an advertisement, performance of the advertisement and history of an advertiser's bidding behavior for the advertisement including accounting for a bidding campaign, budget campaign, or an advertising campaign initiated by the advertiser.

12. The system of claim 11, further comprising a search engine, wherein the search engine returns a list of search results generated from a search query for a search term corresponding to the advertisement received by the advertising publishing center.

13. The system of claim 12, wherein the list of search results generated from the search query for the search term corresponding to the advertisement received by the advertising publishing center displays the ranked advertisements with the list of search results.

14. The system of claim 12, wherein an advertisement display displays a search result list generated by the search engine that includes the advertisements ranked by the advertising publishing center that relate to the search query used in the search engine.

15. The system according to claim 11, wherein the history of an advertiser's bidding behavior for the advertisement further comprises awarding a flexible advertiser a higher quality evaluation.

16. The system according to claim 11, wherein the history of an advertiser's bidding behavior for the advertisement further comprises awarding an active advertiser a higher quality evaluation.

17. A system for advertisement monetization modeling, the system comprising:

a computer system having a processor coupled to a memory, the memory having computer readable code, which when executed by the processor causes the computer system to implement:

an advertising publishing center, which receives the one or more advertisements using the processor, a data resource that stores data corresponding to the advertisements in the memory;

an advertisement engine which defines the advertisements according to the data corresponding to the advertisements stored in the data resource, and ranks the advertisements according to a defined quality of the advertisements using the processor, wherein the defined quality of the advertisements is determined by content of the advertisement according to graphical content of the advertisement relative to other advertisements, relevancy of a landing page of the advertisement, and determining diversity of the advertisement based on uniqueness of the advertisement to an advertiser, performance of the advertisement and history of an advertiser's bidding behavior for the advertisement; and a remote computing device on which the advertisements are displayed.

18. The system according to claim 17, wherein the remote computing device is a hand-held computing device.

19. The system according to claim 17, wherein the advertisements are displayed in a search result list generated by a search engine that is accessed by a user over the Internet.

* * * * *